(12) United States Patent
Ferguson et al.

(10) Patent No.: US 12,143,477 B2
(45) Date of Patent: Nov. 12, 2024

(54) SECURE CRYPTOGRAPHIC TRANSFER USING MULTIPARTY COMPUTATION

(71) Applicant: Capital One Services, LLC, McLean, VA (US)

(72) Inventors: Dexter Ferguson, Catonsville, MD (US); Christian Wiskur, Washington, DC (US)

(73) Assignee: Capital One Services, LLC, McLean, VA (US)

( * ) Notice: Subject to any disclaimer, the term of this patent is extended or adjusted under 35 U.S.C. 154(b) by 239 days.

(21) Appl. No.: 17/931,789

(22) Filed: Sep. 13, 2022

(65) Prior Publication Data

US 2024/0089091 A1   Mar. 14, 2024

(51) Int. Cl.
*H04L 9/00* (2022.01)
*H04L 9/08* (2006.01)

(52) U.S. Cl.
CPC .............. *H04L 9/0838* (2013.01); *H04L 9/50* (2022.05); *H04L 2209/46* (2013.01)

(58) Field of Classification Search
CPC ................................ H04L 9/0838; H04L 9/50
USPC .......................................................... 713/171
See application file for complete search history.

(56) References Cited

U.S. PATENT DOCUMENTS

| | | | |
|---|---|---|---|
| 9,419,996 B2 * | 8/2016 | Porat ..................... | G06F 21/566 |
| 10,122,687 B2 * | 11/2018 | Thomas .................. | H04L 63/10 |
| 10,122,818 B2 * | 11/2018 | Wang ....................... | H04L 67/12 |
| 10,735,551 B2 * | 8/2020 | Wang ....................... | H04L 67/12 |
| 10,929,258 B1 * | 2/2021 | Gauf ........................ | G06N 20/20 |
| 2003/0188189 A1 * | 10/2003 | Desai ..................... | H04L 63/104 |
| | | | 726/23 |
| 2011/0301998 A1 * | 12/2011 | Talwar .................... | H04L 41/00 |
| | | | 709/224 |
| 2012/0304288 A1 * | 11/2012 | Wright ................ | H04L 63/1425 |
| | | | 726/22 |
| 2016/0072834 A1 * | 3/2016 | Bott ...................... | H04L 63/145 |
| | | | 726/1 |
| 2016/0080419 A1 * | 3/2016 | Schiappa ............ | H04L 63/1441 |
| | | | 726/1 |
| 2016/0275289 A1 * | 9/2016 | Sethumadhavan ......................... | |
| | | | H04L 63/0428 |
| 2016/0357966 A1 * | 12/2016 | Porat ...................... | G06F 21/554 |
| 2017/0093897 A1 * | 3/2017 | Cochin ................. | H04L 63/145 |

(Continued)

FOREIGN PATENT DOCUMENTS

WO   WO-2017019391 A1 *   2/2017   ............. G06F 21/55

*Primary Examiner* — Badri Narayanan Champakesan
(74) *Attorney, Agent, or Firm* — Foley & Lardner LLP (57) ABSTRACT

Methods and systems are disclosed herein for cryptographically secured transfer of an item. In some embodiments, the system may cause generation of multiple key shares of a private key from which a blockchain address on a blockchain is derived. The system may generate a cryptographic representation of a physical item to be transferred from the first user to the second user, the physical item corresponding to the first item. The system may cause a first amount of the first item to be transferred to the blockchain address. The system may obtain a candidate cryptographic representation from the second user. The system may generate, based on the candidate hash matching the hash of the feature vector representing the physical item, a signed message using a partial signature of the second user and another partial signature derived from the third key share.

20 Claims, 4 Drawing Sheets

(56) References Cited

U.S. PATENT DOCUMENTS

2018/0018456 A1\*   1/2018   Chen .................... G06F 21/552
2018/0255076 A1\*   9/2018   Paine ................. H04L 63/1416
2019/0387399 A1\* 12/2019   Weinberg ............... H04L 43/04

\* cited by examiner

FIG. 4

SECURE CRYPTOGRAPHIC TRANSFER USING MULTIPARTY COMPUTATION

SUMMARY

Methods and systems are described herein for novel uses and/or improvements to blockchain technology. As one example, methods and systems are described herein for cryptographically providing security to the transfer of items.

Both multisig (or multisignature) schemes and multiparty computation (MPC) threshold signing schemes can enable secure cryptographic transfers by requiring multiple signatures for a single record, thereby avoiding the single point of failure risk. One main difference, however, is that multisig requires each participant to have its own key, while MPC threshold signing utilizes secret shares of a common key. As a result, in addition to higher costs and delays compared to MPC threshold signing schemes, multisig schemes are typically incompatible with blockchain networks that do not natively support multisignatures. On the other hand, MPC threshold signing schemes do not require such native support to work in connection with blockchain operations. Typical MPC threshold signing schemes, however, require eight to twelve signature rounds as a measure to maintain a certain level of security, which causes latency issues that not only delay processing and validating a single network operation, but, in the cumulative, also often results in a substantial negative impact on the network (e.g., wasted computational resources due to retries caused by time-outs, compounded delays due to such retries or other factors, etc.). Reducing the number of signature rounds may help to address latency, but generally decreases the security of such threshold signing schemes.

To overcome one or more of the foregoing technical deficiencies or to increase security of network operations, some methods and systems disclosed herein involve the use of a cryptographic hash or other cryptographic representation of a physical item (e.g., corresponding to a digital file or other item) in connection with generating a signed message derived via an MPC threshold signing scheme for transferring the digital item (e.g., to increase security of network operations related to transferring the item when an MPC scheme with a lower signature round is selected or in other circumstances to increase such security of network operations). In some embodiments, prior to an intermediary computer system generating a signed blockchain message (e.g., indicating transfer of a first item from a first blockchain address to a second blockchain address), the intermediary computer system may verify that a user requesting such transfer has (i) the cryptographic hash corresponding to the physical item, and (ii) a partial signature from which the signed message is to be generated (e.g., the partial signature corresponding to a key share of the requesting user for the first/transferring blockchain address).

In some embodiments, in connection with a request for a transfer of a first item of a first user to a second user, a system may cause generation of key shares of a private key from which a blockchain address on a blockchain is derived. The key shares may include a first key share for the first user, a second key share for the second user, and a third key share for an intermediary entity. The system may generate a cryptographic representation of a physical item (e.g., corresponding to the first item) to be transferred from the first user to the second user (e.g., in connection with the requested transfer of the first item). The system may cause a first amount of the first item to be transferred to the blockchain address. The system may obtain, from the second user (e.g., in connection with the requested transfer of the first item), a candidate cryptographic representation (e.g., of the physical item) and one or more partially-signed messages that indicate transfer of the first amount of the first item from the blockchain address. As an example, the partially-signed messages obtained from the second user may include a partial signature derived from the first key share, a partial signature derived from the second key share, or one or more other partial signatures. Based on the candidate cryptographic representation matching the cryptographic representation of the physical item, the system may generate a signed message using (i) one or more partial signatures of the partially-signed messages, and (i) another partial signature derived from the third key share. As an example, the signed message may indicate transfer of the first amount of the first item from the blockchain address, and the public key corresponding to the blockchain address (and corresponding to the private key common to the key shares) may thus be used to verify whether the indicated transfer is valid. In one scenario, when enough partial signatures are combined, a complete threshold signature is generated.

It should be noted that, while embodiments described herein involve the use of a cryptographic representation of a corresponding physical item in connection with generating a signed message derived via an MPC threshold signing scheme for transferring an item, other embodiments may involve modifying one or more signature threshold criteria (e.g., to increase security of network operations related to transferring the item when an MPC scheme with a lower signature round is selected or in other circumstances to increase such security of network operations). In some embodiments, prior to an intermediary computer system generating a signed blockchain message (e.g., indicating transfer of a first item from a first blockchain address to a second blockchain address), the intermediary computer system may verify that a user requesting such transfer has one or more partial signatures (e.g., corresponding to key shares of both the requesting user and the transferring user for the first/transferring blockchain address). It should also be noted that, while embodiments described herein involve the use of one or more MPC processes, other embodiments may involve the use of one or more multisig processes and multiple "full" signatures (in addition to or in lieu of partial signatures derived from key shares).

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
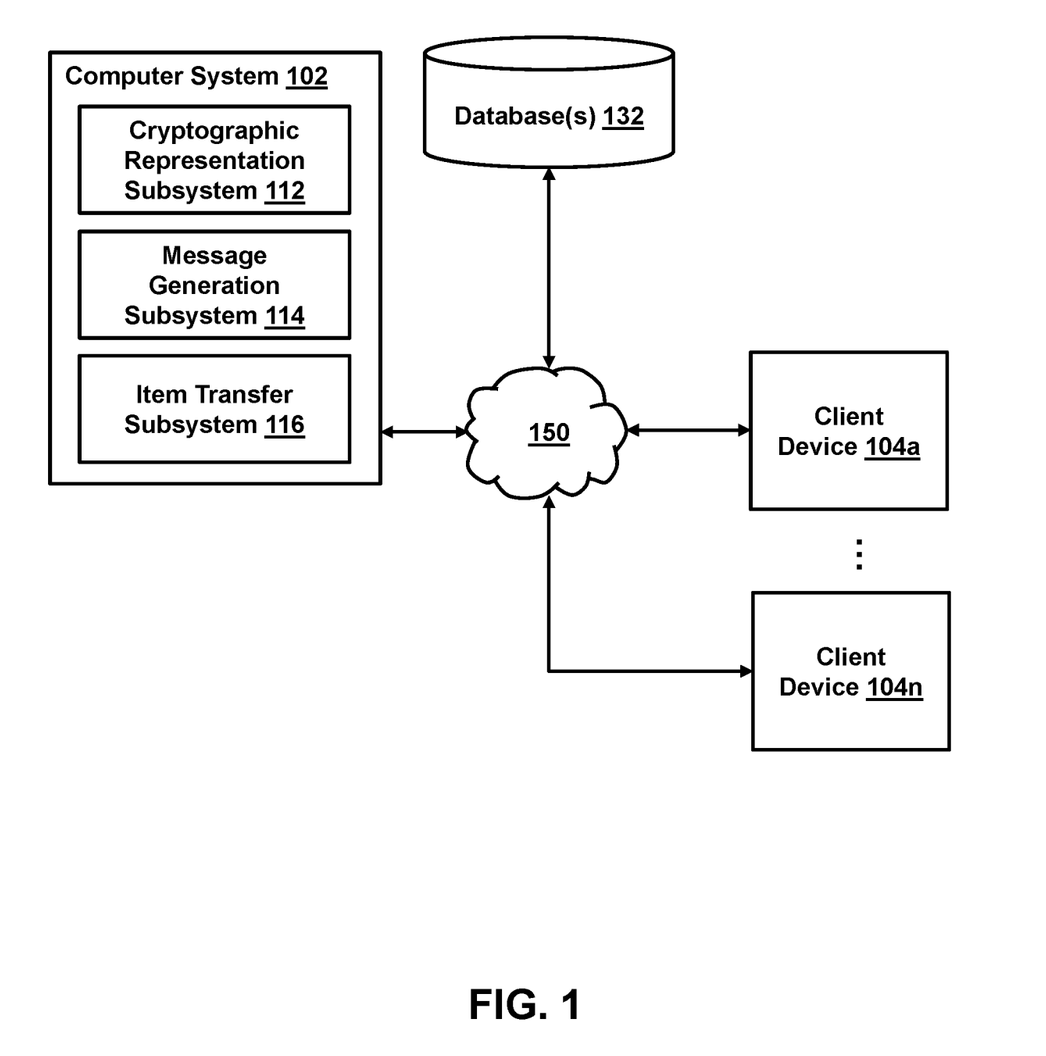
FIG. 1 shows an illustrative diagram for facilitating the transfer of items, in accordance with one or more embodiments.

FIG. 1 shows a system 100 for facilitating the transfer of items, in accordance with one or more embodiments. As shown in FIG. 1, system 100 may include computer system 102, client device(s) 104 (or client devices 104a-104n), database(s) 132, or other components. Computer system 102 may include cryptographic representation subsystem 112, message generation subsystem 114, item transfer subsystem 116, or other components. Each client device 104 may include any type of mobile terminal, fixed terminal, or other device. By way of example, client device(s) 104 may include a desktop computer, a notebook computer, a tablet computer, a smartphone, a wearable device, or other client device. Users may, for instance, utilize client device(s) 104 to interact with one another, servers, or other components of system 100. It should be noted that, while operations are described herein as being performed by particular components of computer system 102, those operations may, in some embodiments, be performed by other components of computer system 102 or other components of system 100. As an example, while some operations are described herein as being performed by components of computer system 102, those operations may, in some embodiments, be performed by components of client device(s) 104. It should be noted that, although some embodiments are described herein with respect to machine learning models, other prediction models (e.g., statistical models or other analytics models) may be used in lieu of or in addition to machine learning models in other embodiments (e.g., a statistical model replacing a machine learning model and a non-statistical model replacing a non-machine-learning model in one or more embodiments).

As discussed, both multisig (or multisignature) schemes and MPC threshold signing schemes can enable secure cryptographic transfers by requiring multiple signatures for a single record, thereby avoiding the single point of failure risk. In some circumstances, it may be advantageous to use an MPC threshold signing scheme (e.g., scenarios involving use of a blockchain that does not natively support multisignatures) despite the additional signature rounds and computational burden.

Some embodiments involve the use of a cryptographic representation of another item (e.g., corresponding to a digital item) in connection with generating a signed message derived via an MPC threshold signing scheme for transferring the digital item (e.g., to increase security of network operations related to transferring the item when an MPC scheme with a lower signature round is selected or in other circumstances to increase such security of network operations). As an example, prior to the system 100 generating a signed message (e.g., indicating transfer of a first item from a first blockchain address to a second blockchain address), the system 100 may verify that a user requesting such transfer has (i) the cryptographic representation corresponding to the other item, and (ii) a partial signature from which the signed message is to be generated (e.g., the partial signature corresponding to a key share of the requesting user for the first/transferring blockchain address).

Additionally, or alternatively, some embodiments involve modifying one or more signature threshold criteria (e.g., to increase security of network operations related to transferring the item when an MPC scheme with a lower signature round is selected or in other circumstances to increase such security of network operations). As an example, prior to the system 100 generating a signed blockchain message (e.g., indicating transfer of a first item from a first blockchain address to a second blockchain address), the system 100 may verify that a user requesting such transfer has one or more partial signatures (e.g., corresponding to key shares of both the requesting user and the transferring user for the first/transferring blockchain address). In one use case, while a signature threshold scheme may require a 2-of-3 partial signatures (respectively derived from two of the three key shares) by default, system 100 may instead require a greater number of partial signatures (e.g., 3-of-3 partial signatures respectively derived from all three key shares) in response to one or more triggers indicating a need for greater security.

In some embodiments, system 100 may generate a signed message and submit the signed message to a blockchain (or other network) to transfer a first item (or amount thereof) from a first address to another address. As an example, the signed message may include an indication to transfer the first item (from the first address to the other address) and a digital signature for the message portion that contains the transfer indication. In one use case, the transfer indication may include a digital asset identifier (e.g., corresponding to the first item or the first amount of the first item), the first address as a source location, the other address as a destination location, or other components.

In some embodiments, system 100 may generate the signed message in connection with a request to transfer the first item of a first user to a second user. In some embodiments, prior to generating the signed message, system 100 may obtain one or more messages that include one or more signatures and an indication to transfer the first item from a source to a destination. As an example, in an MPC threshold signing scenario, the messages may include one or more partially-signed messages having partial signatures (e.g., derived from key shares of multiple users), and system 100 may use the partial signatures to generate the signed message to transfer a first amount of the first item from a first address to a destination address (e.g., by combining the partial signatures to generate the signature for the signed message, by inputting the partial signatures as parameters into a signature generation function to obtain the signature, etc.). In one scenario, where the first address is derived from a private key corresponding to the key shares, a complete threshold signature is generated when a threshold number of the partial signatures derived from the corresponding key shares are used.

As another example, in a multisig address scenario, the obtained messages may include signatures derived from full private keys (e.g., corresponding to the multisig address from which a transfer will be sourced). In one scenario, system 100 may determine whether the messages are valid (e.g., by verifying the messages using the corresponding public keys) and, in response to a valid determination, system 100 may generate the signed message. In one scenario, system 100 may generate the signed message by "signing" the obtained messages (or at least one such message) or signing a new message (with the same transfer instruction) using another private key corresponding to the same multisig address. In a further scenario, system 100 may determine whether a threshold number of signatures corresponds to the valid private key (e.g., the private keys corresponding to the multisig address). As an example, system 100 may generate and submit the signed message in response to determination that the threshold number of signatures has been satisfied. In one use case, where 3-of-3 signatures are required for a transfer from the multisig address, system 100 may generate and submit the signed message in response to determining that two valid signatures for transferring resources from the multi-sig address have been obtained or recorded on the network. As such, the signed message may act as the final signature before the execution of the resource transfer from the multisig address.

In some embodiments, in connection with a request for a transfer of a first item of a first user to a second user, system 100 may cause generation of key shares of a key (e.g., a private key from which a first address is derived). System 100 may subsequently use a threshold number of partial signatures created from the respective key shares to generate a signed message to transfer resources at the first address (e.g., a first amount of the first item at the first address) from the first address to one or more other addresses. In some embodiments, system 100 may obtain, from the second user, a candidate cryptographic representation of a physical item (e.g., corresponding to the first item of the first user) and generate the signed message based on the cryptographic representation of the physical item. As an example, the candidate cryptographic representation may be a cryptographic representation of a token corresponding to the physical item (e.g., a token identifier for the physical item, a token on the physical item that specifies the resource transfer from the first address, etc.), a cryptographic representation of an image corresponding to the physical item (e.g., an image depicting the physical item, an image of a QR code or other code representing the physical item, etc.), or other cryptographic representation.

In one use case, the candidate cryptographic representation may be a hash of the token, a hash of the image, or other cryptographic representation. In another use case, the candidate cryptographic representation (or any of the foregoing hashes) may be a digital signature of the token or the image corresponding to the physical item. As an example, the digital signature may be a partial signature that is created by signing the token or the image with one of the key shares (e.g., a first key share of the first user, a second key share of the second user, etc.). In one scenario, the first user may sign such a token or image with the first key share and send the signed token/image to the second user, and the second user may send the signed token/image as part of or along with a signed message indicating the resource transfer from the first address to another address (e.g., designated by the second user). In another scenario, the first user may send the first key share to the second user, and the second user may sign the token/image with the first key share and send the signed token/image as part of or along with the signed message. In this way, for example, the second user may use the signed token/image to indicate that the first user has authorized the resource transfer.

In some embodiments, in connection with a request for a transfer of a first item of a first user to a second user, computer system 102 may obtain one or more messages that (i) include one or more signatures (e.g., full or partial signatures) and (ii) indicates transfer of a first amount of the first item from a blockchain address to another blockchain address. Computer system 102 may then use the messages to facilitate the resource transfer. As an example, where the blockchain address is a multisig address, the blockchain address may correspond to multiple private keys, and a threshold number of the private keys must be used to sign a transaction related to the resources at the blockchain address (e.g., the resources at the associated multisig wallet). In one use case, the first user may have a first private key, the second user may have a second private key, a third user may have a third private key (e.g., an intermediate entity or other user has the third private key), and so on. As another example, the blockchain address may correspond to a private key from which multiple key shares are generated via an MPC scheme, where the first user may have a first key share, the second user may have a second key share, a third user may have a third key share (e.g., an intermediate entity or other user has the third key share), and so on.

In one scenario, in response to a user request to send a nonfungible token of a first user to a second user subject to one or more conditions, an intermediary entity system (e.g., computer system 102) may cause the nonfungible token to be transferred to an intermediary blockchain address that is controlled by one or more keys (e.g., multiple key shares of a private key corresponding to the intermediary blockchain address). Once transferred to the intermediary blockchain address, a threshold number of the keys (or the key shares) is required for the transfer of resources from the intermediary blockchain address to another blockchain address. In a 2-of-3 or 3-of-3 threshold signature scenario, a first key share may be generated by the first user, a second key share may be generated by the second user, and a third key share may be generated by the intermediary entity. As an example, in response to one or more conditions related to the transfer being satisfied (e.g., identification verification of the second user, confirmation that one or more services have been rendered by the second user or accepted by the first user, etc.), the intermediary entity system may cause the first user to transfer the first key share to the second user, thereby enabling the second user to "sign" in place of the first user using the first key share to conduct transfer of resources from the intermediary blockchain address. In the 3-of-3 threshold scenario, however, the intermediary entity would still need to approve of any such resource transfer to complete the resource transfer (e.g., because the third key share controlled by the intermediary entity is needed to generate the complete signature).

In another scenario, in response to a user request from a first user to facilitate a transfer of a certain amount of a first currency (e.g., $1,000 USD) to a second user, an intermediary entity system (e.g., a banking system that includes computer system 102) may fund an intermediary wallet with a corresponding first amount of a cryptocurrency (e.g., a stablecoin or other cryptocurrency). As an example, while the first user may appear to be purchasing a virtual check, the first user may actually be purchasing the first amount of cryptocurrency to fund the intermediary wallet, and the intermediary wallet may reflect an account having an intermediary blockchain address on a blockchain.

In some scenarios, the intermediary entity may send the virtual check to the first user in the form of a file or other digital asset (e.g., a token or image indicating the transfer of the first amount of cryptocurrency from the intermediary blockchain address to a pre-designated blockchain address associated with the second user). In some scenarios, the intermediary entity may send (or enable the first user to print) a paper check (e.g., where the paper check includes the token or image indicating the transfer of the first amount of cryptocurrency). As an example, the virtual or paper check may include a QR code that specifies the blockchain transaction transferring the first amount of the cryptocurrency (e.g., from the intermediary blockchain address to the pre-designated blockchain address associated with the second user).

In some scenarios, when the first user is ready to release the funds to the second user (e.g., once the first user is satisfied with the second user's services, once the conditions for the release of the payment occurs, etc.), the first user may generate a hash of the token/image by providing the token/image to a hash function to obtain the hash as an output of the hash function. The first user may then send the hash to the second user, and the second user may use the hash to demonstrate that the first user has "given" the check to the second user. In some scenarios, the first user may sign the token/image with the first key share and send the signed token/image to the second user. The second user may send the signed token/image as part of or along with a signed message (indicating the resource transfer) to the intermediary entity. In another scenario, the first user may send the first key share to the second user, and the second user may sign the token/image with the first key share and send the signed token/image as part of or along with the signed message. In this way, for example, the second user may use the signed token/image to indicate that the first user has authorized the resource transfer.

In some embodiments, computer system 102 may communicate with one or more user devices (e.g., client devices 104) and cause the generation of key shares. For example, computer system 102 (e.g., via cryptographic representation subsystem 112) may transmit first instructions for generating the first key share to a first computer system of the first user and second instructions for generating the second key share to a second computer system of the second user. As another example, computer system 102 may use cryptographic representation subsystem 112 to generate a third key share, which may be used as part of an MPC threshold signing scheme.

Computer system 102 may communicate with client devices to receive a candidate hash or cryptographic representation. For example, the second user may generate a candidate hash based on the feature vector extracted from a physical item, which they may submit through their device to cryptographic representation subsystem 112. A feature vector may be a numerical array which captures the essential aspects of an object obtained by feature extraction methods. For example, a system may produce a feature vector of an image using a computer vision machine learning model. The model may perform optical character recognition, edge detection, convolution, or some combination of the above to produce an output which captures noteworthy portions of the image. In a simple example, a feature vector may be a list of RGB values of each pixel in an image. A cryptographic representation may then be generated from the feature vector. For example, a cryptographic representation may be a hash of the feature vector produced by a hash function. A hash function takes as input a numerical array and maps the array onto a fixed set of values. Cryptographic subsystem 112 may access database(s) 132 and browse for the correct cryptographic representation representing the transfer of the first item. Upon finding the correct hash, and the correct hash matching the candidate hash in each bit, cryptographic representation subsystem 112 may instruct message generation subsystem 114 that the transaction should be completed whenever a partial signature from the second user is received.

Computer system 102 may communicate with entities involved in the transfer to receive a partially-signed message. For example, the computer system 102 may receive a partially-signed message including a partial signature derived from the second key share indicating a transfer of the first item. The computer system 102 may store the partially-signed message in database(s) 132. Otherwise, if computer system 102 has already determined that the transaction should be completed, the computer system 102 (e.g., via message generation subsystem 114) may complete the signature on the message. The computer system 102 (e.g., via item transfer subsystem 116) may then transmit the signed message (e.g., a signed transaction with the complete signature) to the blockchain.

In one use case, with respect to a purchase using an escrow intermediary, a first user (or buyer) may wish to contract the services of a second user (or a service provider) and pay upon completion of service. The computer system 102 may cause the first user, the second user, and the intermediary (e.g., via their respective computer systems) to each generate a private key share of a key which corresponds to a given blockchain address of a blockchain (e.g., which may reflect an escrow account). The blockchain address may correspond to an intermediary wallet, the access to which is granted only with a signed message using two of the three key shares. For example, to facilitate the exchange, the first user may purchase an amount of digital assets equivalent to their payment to the service provider. The first user may transfer the assets into the blockchain address to be held in the cryptography-based storage application. If the service is provided as agreed upon, the second user may provide proof of their services to the intermediary as a cryptographic representation of some physical item documenting their services. The second user may also send a partially-signed message indicating a request to access the assets at the blockchain address. The intermediary may process (e.g., using computer system 102) the cryptographic representation and the partially-signed message. For example, intermediary may compare the cryptographic representation against a preset expectation to verify that the service has been performed. In response to such verification, the intermediary may proceed to create a fully signed message using the partially-signed message received from the second user.

Figure 2:
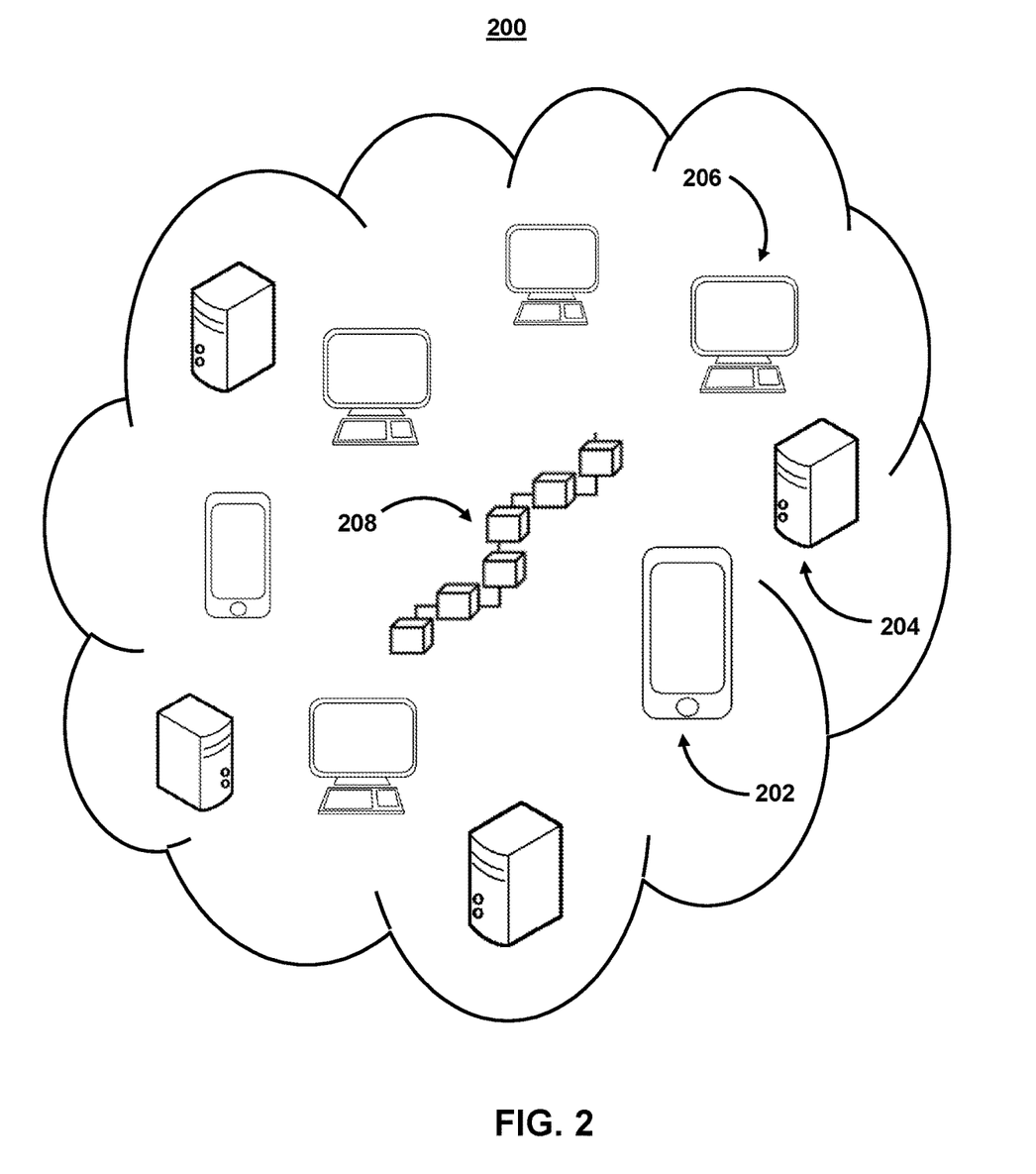
FIG. 2 shows an illustrative diagram for conducting blockchain operations, in accordance with one or more embodiments.

FIG. 2 shows an illustrative diagram for a decentralized environment for performing blockchain functions, in accordance with one or more embodiments. For example, the diagram presents various components that may be used for causing the generation of key shares, partially-signing messages, and matching cryptographic representations in some embodiments.

As shown in FIG. 2, system 200 may include multiple user devices (e.g., user device 202, user device 202, and/or user device 206). For example, system 200 may include a distributed state machine, in which each of the components in FIG. 2 acts as a client of system 200. For example, system 200 (as well as other systems described herein) may include a large data structure that holds not only all accounts and balances but also a state machine, which can change from block to block according to a predefined set of rules, and which can execute arbitrary machine code. The specific rules of changing state from block to block may be maintained by a virtual machine (e.g., a computer file implemented on and/or accessible by a user device, which behaves like an actual computer) for the system. For example, system 200 may interact with, and facilitate the function of, blockchain 208.

It should be noted that, while shown as a smartphone, a personal computer, and a server in FIG. 2, the user devices may be any type of computing device, including, but not limited to, a laptop computer, a tablet computer, a hand-held computer, and/or other computing equipment (e.g., a server), including "smart," wireless, wearable, and/or mobile devices. It should be noted that embodiments describing system 200 performing a blockchain function may equally be applied to, and correspond to, an individual user device (e.g., user device 202, user device 208, and/or user device 210) performing the blockchain function. That is, system 200 may correspond to the user devices (e.g., user device 202, user device 204, and/or user device 206) collectively or individually.

Each of the user devices may be used by the system to conduct blockchain functions and/or contribute to the cryptographic security of the transfer of an item. As referred to herein, "blockchain functions" may include any operations including and/or related to blockchains and blockchain technology. For example, blockchain functions may include conducting transactions, querying a distributed ledger, generating additional blocks for a blockchain, transmitting communications-related nonfungible tokens, performing encryption/decryption, exchanging public/private keys, and/or other operations related to blockchains and blockchain technology. In some embodiments, a blockchain function may include the creation, modification, detection, and/or execution of a smart contract or program stored on a blockchain. For example, a smart contract may include a program stored on a blockchain that is executed (e.g., automatically, without any intermediary's involvement or time loss) when predetermined conditions are met. In some embodiments, a blockchain function may include the creation, modification, exchange, and/or review of a token (e.g., a digital blockchain-specific asset), including a nonfungible token. A nonfungible token may include a token that is associated with a good, a service, a smart contract, and/or other content that may be verified by, and stored using, blockchain technology.

In some embodiments, blockchain functions may also include actions related to mechanisms that facilitate other blockchain functions (e.g., actions related to metering activities for blockchain functions on a given blockchain network). For example, Ethereum, which is an open source, globally decentralized computing infrastructure that executes smart contracts, uses a blockchain to synchronize and store the system's state changes. Ethereum uses a network-specific cryptocurrency called ether to meter and constrain execution resource costs. The metering mechanism is referred to as "gas." As the system executes a smart contract, the system accounts for every blockchain function (e.g., computation, data access, transaction, etc.). Each blockchain function has a predetermined cost in units of gas (e.g., as determined based on a predefined set of rules for the system). When a blockchain function triggers the execution of a smart contract, the blockchain function may include an amount of gas that sets the upper limit of what can be consumed in running the smart contract. The system may terminate execution of the smart contract if the amount of gas consumed by computation exceeds the gas available in the blockchain function. For example, in Ethereum, gas includes a mechanism for allowing Turing-complete computation while limiting the resources that any smart contract and/or blockchain function may consume.

In some embodiments, gas may be obtained as part of a blockchain function (e.g., a purchase) using a network-specific cryptocurrency (e.g., ether in the case of Ethereum). The system may require gas (or the amount of the network-specific cryptocurrency corresponding to the required amount of gas) to be transmitted with the blockchain function as an earmark to the blockchain function. In some embodiments, gas that is earmarked for a blockchain function may be refunded back to the originator of the blockchain function if, after the computation is executed, an amount remains unused.

As shown in FIG. 2, user devices may include a digital wallet (e.g., digital wallet 204) used to perform blockchain functions. For example, the digital wallet may include a repository that allows users to store, manage, and trade their cryptocurrencies and assets, interact with blockchains, and/or conduct blockchain functions using applications. The digital wallet may be specific to a given blockchain protocol or may provide access to multiple blockchain protocols. In some embodiments, the system may use various types of wallets, such as hot wallets and cold wallets. Hot wallets are connected to the Internet while cold wallets are not. Most digital wallet holders hold both a hot wallet and a cold wallet. Hot wallets are most often used to perform blockchain functions, while a cold wallet is generally used for managing a user account and may have no connection to the Internet.

As shown in FIG. 2, user devices may include a private key (e.g., key 212) and/or digital signature. For example, system 200 may use cryptographic systems for conducting blockchain functions, such as producing partially-signed messages using private key shares. For example, system 200 may use public key cryptography, which features a pair of digital keys (e.g., which may include strings of data). In such cases, each pair includes a public key (e.g., which may be public) and a private key (e.g., which may be kept private). System 200 may generate the key pairs using cryptographic algorithms (e.g., featuring one-way functions). System 200 may then encrypt a message (or other blockchain function) using an intended receiver's public key such that the encrypted message may be decrypted only with the receiver's corresponding private key. In some embodiments, system 200 may combine a message with a private key to create a digital signature on the message. Where the message requires more than one key share to fully sign, the system may combine a partially-signed message with a key share not already used to create the partially-signed message to complete the signature. For example, the digital signature may be used to verify the authenticity of blockchain functions. As an illustration, when conducting blockchain functions, system 200 may use the digital signature to prove to every node in the system that it is authorized to conduct the blockchain functions.

For example, system 200 may include a plurality of nodes for the blockchain network. Each node may correspond to a user device (e.g., user device 202). A node for a blockchain network may include an application or other software that records and/or monitors peer connections to other nodes and/or miners for the blockchain network. For example, a miner includes a node in a blockchain network that facilitates blockchain functions by verifying blockchain functions on the blockchain, adding new blocks to the existing chain, and/or ensuring that these additions are accurate. The nodes may continually record the state of the blockchain and respond to remote procedure requests for information about the blockchain.

For example, user device 202 may request a blockchain function (e.g., conduct a transaction). The blockchain function may be authenticated by user device 204 and/or another node (e.g., a user device in the community network of system 200). For example, using cryptographic keys, system 200 may identify users and give access to their respective user accounts (e.g., corresponding digital wallets) within system 200. Using private keys (e.g., known only to the respective users) and public keys (e.g., known to the community network), system 200 may create digital signatures to authenticate the users.

Following an authentication of the blockchain function, the blockchain function may be authorized. For example, after the blockchain function is authenticated between the users, system 200 may authorize the blockchain function prior to adding it to the blockchain. System 200 may add the blockchain function to blockchain 208. System 200 may perform this based on a consensus of the user devices within system 200. For example, system 200 may rely on a majority (or other metric) of the nodes in the community network (e.g., user device 202, user device 204, and/or user device 206) to determine that the blockchain function is valid. In response to validation of the block, a node user device (e.g., user device 202, user device 204, and/or user device 206) in the community network (e.g., a miner) may receive a reward (e.g., in a given cryptocurrency) as an incentive for validating the block.

To validate the blockchain function, system 200 may use validation protocols and/or validation (or consensus) mechanisms. For example, system 200 may use a proof-of-work (POW) mechanism in which a user device must provide evidence that it performed computational work to validate a blockchain function, and thus, this mechanism provides a manner for achieving consensus in a decentralized manner, as well as preventing fraudulent validations. For example, the POW may involve iterations of a hashing algorithm. The user device that is successful aggregates and records blockchain functions from a mempool (e.g., a collection of all valid blockchain functions waiting to be confirmed by the blockchain network) into the next block. Alternatively, or additionally, system 200 may use a proof-of-stake (POS) mechanism in which a user account (e.g., corresponding to a node on the blockchain network) is required to have, or "stake," a predetermined amount of tokens in order for system 200 to recognize it as a validator in the blockchain network.

In response to validation of the block, the block is added to blockchain 208, and the blockchain function is completed. For example, to add the blockchain function to blockchain 208, the successful node (e.g., the successful miner) encapsulates the blockchain function in a new block before transmitting the block throughout system 200.

Figure 3:
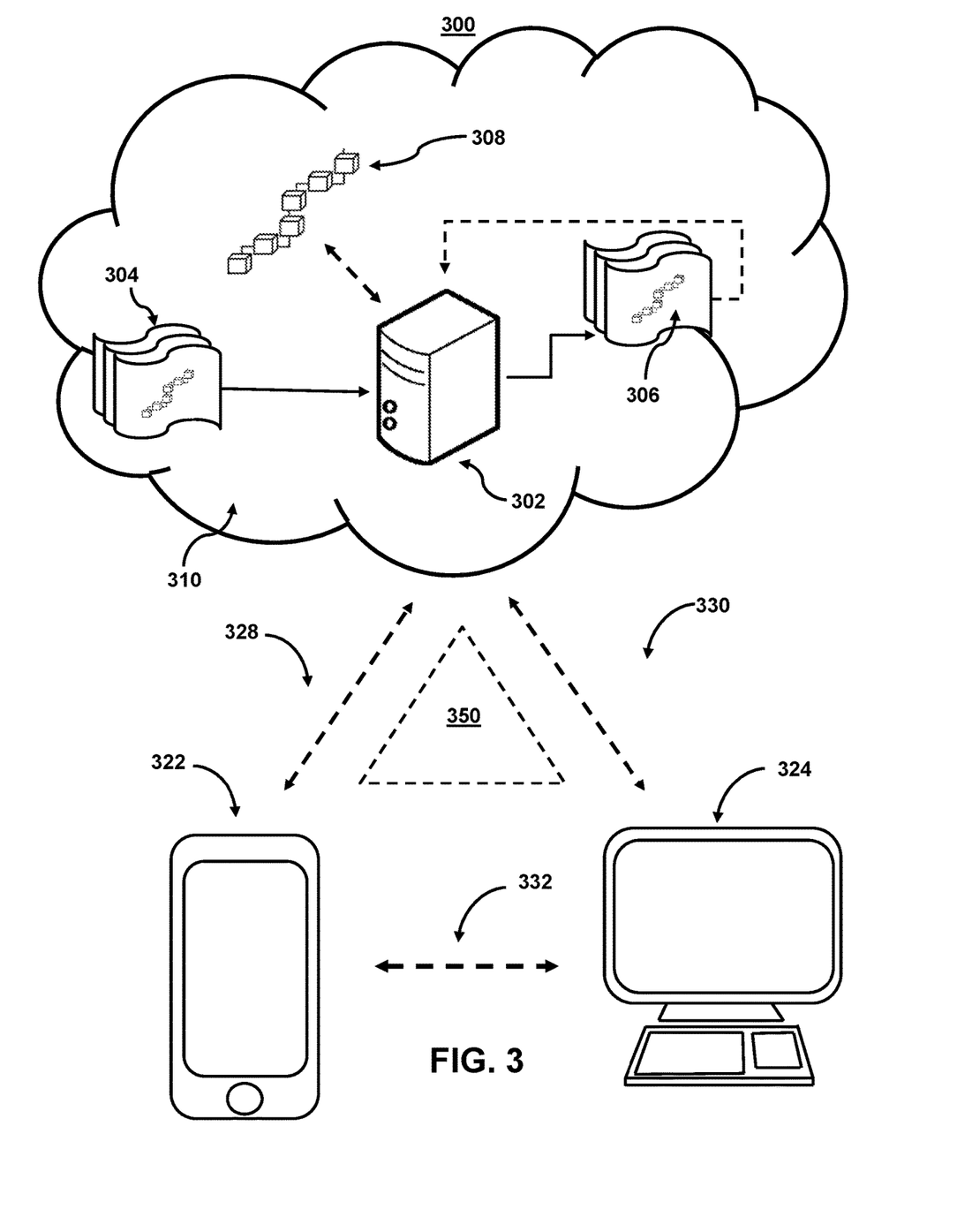
FIG. 3 shows illustrative components for a system used to communicate with one or more user devices and perform computations, in accordance with one or more embodiments.

FIG. 3 shows illustrative components for a system used to communicate between computer systems for the purposes of distributed key generation, hash comparisons, and signing, sending, and receiving messages, in accordance with one or more embodiments. For example, FIG. 3 may show illustrative components for causing the generation of key shares, partially-signing messages, and matching cryptographic representations. As shown in FIG. 3, system 300 may include mobile device 322 and user terminal 324. While shown as a smartphone and personal computer, respectively, in FIG. 3, it should be noted that mobile device 322 and user terminal 324 may be any computing device, including, but not limited to, a laptop computer, a tablet computer, a hand-held computer, and other computer equipment (e.g., a server), including "smart," wireless, wearable, and/or mobile devices. FIG. 3 also includes cloud components 310. Cloud components 310 may alternatively be any computing device as described above, and may include any type of mobile terminal, fixed terminal, or other device. For example, cloud components 310 may be implemented as a cloud computing system, and may feature one or more component devices. It should also be noted that system 300 is not limited to three devices. Users may, for instance, utilize devices to interact with one another, servers, or other components of system 300. It should be noted that, while operations are described herein as being performed by particular components of system 300, these operations may, in some embodiments, be performed by other components of system 300. As an example, while operations are described herein as being performed by components of mobile device 322, these operations may, in some embodiments, be performed by components of cloud components 310. In some embodiments, the various computers and systems described herein may include computing devices that are programmed to perform the described functions. Additionally, or alternatively, multiple users may interact with system 300 and/or components of system 300. For example, in one embodiment, a first user and a second user may interact with system 300 using two different components.

With respect to the components of mobile device 322, user terminal 324, and cloud components 310, each of these devices may receive content and data via input/output (I/O) paths. Each of these devices may also include processors and/or control circuitry to send and receive commands, requests, and other suitable data using the I/O paths. The control circuitry may include any suitable processing, storage, and/or I/O circuitry. Each of these devices may also include a user input interface and/or user output interface (e.g., a display) for use in receiving and displaying data. For example, as shown in FIG. 3, both mobile device 322 and user terminal 324 include a display upon which to display data (e.g., conversational response, queries, and/or notifications).

Additionally, or alternatively, as mobile device 322 and user terminal 324 are shown as touchscreen smartphones, these displays also act as user input interfaces. It should be noted that in some embodiments, the devices may have neither user input interfaces nor displays, and may instead receive and display content using another device (e.g., a dedicated display device such as a computer screen, and/or a dedicated input device, such as a remote control, mouse, voice input, etc.). Additionally, or alternatively, the devices in system 300 may run an application (or another suitable program).

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3 also includes communication paths 328, 330, and 332. Communication paths 328, 330, and 332 may include the Internet, a mobile phone network, a mobile voice or data network (e.g., a 5G or LTE network), a cable network, a public switched telephone network, or other types of communications networks or combinations of communications networks. Communication paths 328, 330, and 332 may separately or together include communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Cloud components 310 may access blockchain network 308 (e.g., which in some embodiments may correspond to blockchain 208 (FIG. 2)). Additionally, or alternatively, cloud components 310 may communicate with one or more user devices for the purposes of key generation, cryptographic address registration, and message signing.

Cloud components 310 may include model 302, which may be a machine learning model, artificial intelligence model, deep learning model, etc. (which may be referred to collectively herein as "models"). Model 302 may take inputs 304 and provide outputs 306. The inputs may include multiple datasets, such as a training dataset and a test dataset. Each of the plurality of datasets (e.g., inputs 304) may include data subsets related to user data, predicted forecasts and/or errors, and/or actual forecasts and/or errors. In some embodiments, outputs 306 may be fed back to model 302 as input to train model 302 (e.g., alone or in conjunction with user indications of the accuracy of outputs 306, labels associated with the inputs, or with other reference feedback information). For example, the system may receive a first labeled feature input, where the first labeled feature input is labeled with a known prediction for the first labeled feature input. The system may then train the first machine learning model to classify the first labeled feature input with the known prediction.

In a variety of embodiments, model 302 may update its configurations (e.g., weights, biases, or other parameters) based on the assessment of its prediction (e.g., outputs 306) and reference feedback information (e.g., user indication of accuracy, reference labels, or other information). In a variety of embodiments, where model 302 is a neural network, connection weights may be adjusted to reconcile differences between the neural network's prediction and reference feedback. In a further use case, neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 302 may be trained to generate better predictions.

In some embodiments, model 302 may include an artificial neural network. In such embodiments, model 302 may include an input layer and hidden layers. Each neural unit of model 302 may be connected with many other neural units of model 302. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 302 may be self-learning and trained, rather than explicitly programmed, and can perform significantly better in certain areas of problem solving, as compared to traditional computer programs. During training, an output layer of model 302 may correspond to a classification of model 302, and an input known to correspond to that classification may be input into an input layer of model 302 during training. During testing, an input without a known classification may be input into the input layer, and a determined classification may be output.

In some embodiments, model 302 may include multiple layers (e.g., where a signal path traverses from front layers to back layers). In some embodiments, back propagation techniques may be utilized by model 302 where forward stimulation is used to reset weights on the "front" neural units. In some embodiments, stimulation and inhibition for model 302 may be more free-flowing, with connections interacting in a more chaotic and complex fashion. During testing, an output layer of model 302 may indicate whether or not a given input corresponds to a classification of model 302 (e.g., whether a candidate hash corresponds to the correct underlying feature vector).

In some embodiments, the model (e.g., model 302) may automatically perform actions based on outputs 306. In some embodiments, the model (e.g., model 302) may not perform any actions. The output of the model (e.g., model 302) may be used to match candidate cryptographic representations to the hash of feature vectors.

System 300 also includes API layer 350. API layer 350 may allow the system to generate summaries across different devices. In some embodiments, API layer 350 may be implemented on user device 322 or user terminal 324. Alternatively, or additionally, API layer 350 may reside on cloud components 310. API layer 350 (which may be a REST or web services API layer) may provide a decoupled interface to data and/or functionality of the applications. API layer 350 may provide a common, language-agnostic way of interacting with an application. Web services APIs offer a well-defined contract (e.g., Web Services Description Language (WSDL)) that describes the services in terms of its operations and the data types used to exchange information. REST APIs do not typically have this contract; instead, they are documented with client libraries for most common languages, including Ruby, Java, PHP, and JavaScript. Simple Object Access Protocol (SOAP) web services have traditionally been adopted in the enterprise for publishing internal services, as well as for exchanging information with partners in B2B transactions.

API layer 350 may use various architectural arrangements. For example, system 300 may be partially based on API layer 350, such that there is strong adoption of SOAP and RESTful web services, using resources like Service Repository and Developer Portal, but with low governance, standardization, and separation of concerns. Alternatively, or additionally, system 300 may be fully based on API layer 350, such that separation of concerns between layers like API layer 350, services, and applications are in place.

In some embodiments, the system architecture may use a microservice approach. Such systems may use two types of layers: Front-End Layer and Back-End Layer where microservices reside. In this kind of architecture, the role of the API layer 350 may provide integration between Front-End and Back-End. In such cases, API layer 350 may use RESTful APIs (exposition to front-end or even communication between microservices). API layer 350 may use Advanced Message Queuing Protocol (AMQP) (e.g., Kafka, RabbitMQ, etc.). API layer 350 may use incipient usage of new communications protocols such as gRPC, Thrift, etc.

In some embodiments, the system architecture may use an open API approach. In such cases, API layer 350 may use commercial or open-source API platforms and their modules. API layer 350 may use a developer portal. API layer 350 may use strong security constraints applying (Web Application Firewall) WAF and Distributed Denial of Service (DDoS) protection, and API layer 350 may use RESTful APIs as standard for external integration.

Figure 4:
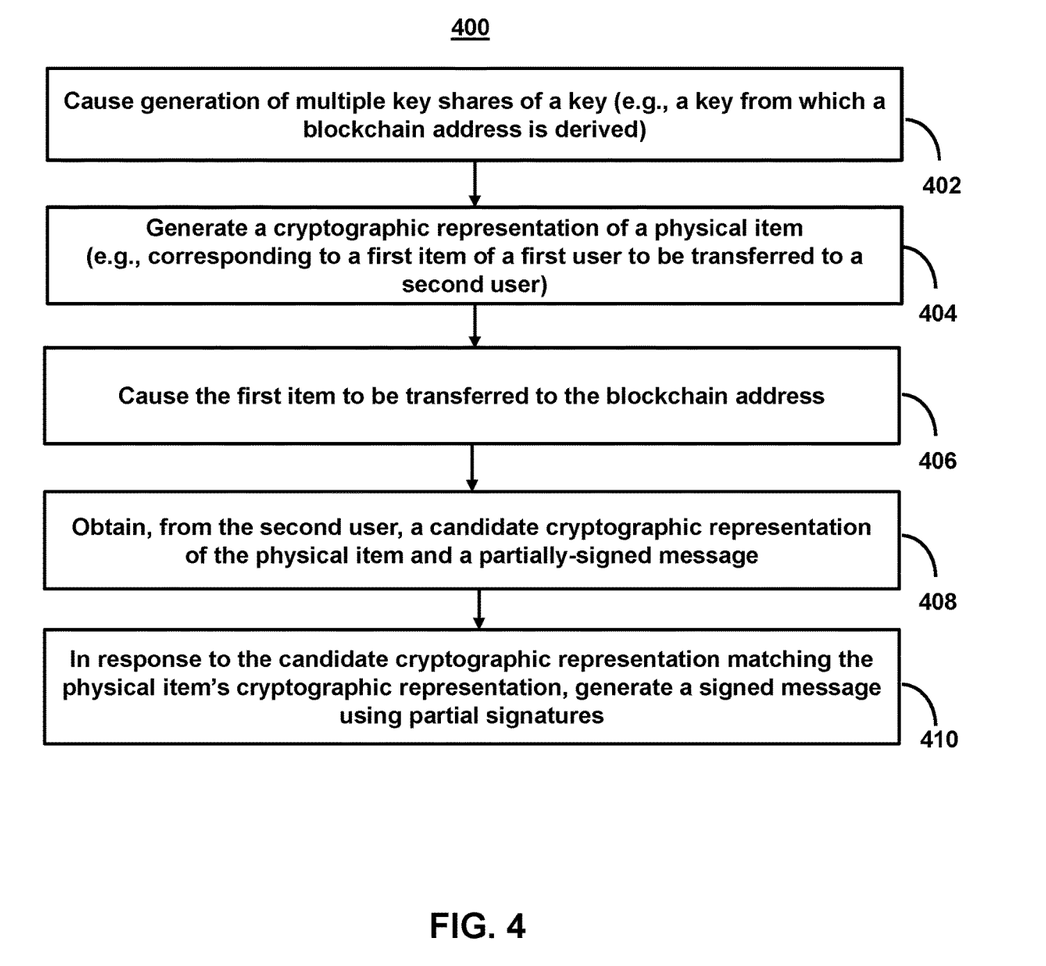
FIG. 4 shows a flowchart of the steps involved in securing the transfer of an item, in accordance with one or more embodiments.

FIG. 4 shows a flowchart of a method (e.g., process 400) involved in facilitating the transfer of items, in accordance with one or more embodiments. The processing operations of the method presented below are intended to be illustrative and non-limiting. In some embodiments, for example, the method may be accomplished with additional operations not described and/or without the operations discussed. Additionally, or alternatively, the order in which the processing operations of the method are illustrated (and described below) is not intended to be limiting.

In some embodiments, the method may be implemented in one or more processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the methods in response to instructions stored electronically on an electronic storage medium. The processing devices may include one or more devices configured through hardware, firmware, and/or software to be specifically designed for execution of one or more of the operations of the methods.

At step 402, process 400 (e.g., using one or more components described above) causes generation of multiple key shares of a key (e.g., from which a blockchain address is derived). As an example, the generated key shares may include key shares of a private key from which the blockchain address on a blockchain is derived. The key shares may include a first key share for a first user, a second key share for a second user, a third key share for a third user (e.g., an intermediary entity between the users), or other key shares for one or more other users. As another example, the key shares may be generated in connection with a request for a transfer of a first item of the first user to the second user (e.g., generated in response to receiving the transfer request, generated prior to receiving the transfer request for use with such a transfer request between the users, etc.).

In some embodiments, step 402 may include causing the distributed generation of the key shares. For example, the distributed generation of the key shares may be caused by transmitting first instructions for generating the first key share to a first computer system of the first user, transmitting second instructions for generating the second key share to a second computer system of the second user, or transmitting instructions for generating one or more other key shares to one or more other computer systems of other users. In one use case, the first key share is generated by the first computer system of the first user, the second key share is generated by the second computer system of the second user, and the third key share is generated by a computer system of the intermediary entity. In one scenario, the first user may be a purchaser of a good or service, the second user may be a provider of the good or service, and the intermediary entity may be an arbitrator or escrow to a transaction between the two users.

At step 404, process 400 (e.g., using one or more components described above) generates a cryptographic representation of a physical item. For example, the cryptographic representation may be a cryptographic representation of a physical item to be transferred from the first user to the second user in connection with the requested transfer of the first item. In one use case, the physical item may correspond to the first item of the first user to be transferred to the second user. In some embodiments, the physical item may be a printed picture or some other physical derivative of the first item.

In some embodiments, step 404 may include obtaining an image to be printed as the physical item and extracting features of the image to generate a feature vector of the image to be printed as the physical item. For example, the cryptographic representation of the physical item may be generated by providing the feature vector of the image as input to a hash function to obtain a hash of the feature vector of the image, and the cryptographic representation may be the output of the hash function (e.g., the hash of the feature vector of the image).

At step 406, process 400 (e.g., using one or more components described above) transfers the first item to the blockchain address (e.g., corresponding to a key from which the key shares of the users are derived). For example, a first amount of the first item may be transferred to the blockchain address. Once transferred to the blockchain address, a threshold number of the key shares (derived from the corresponding key) may be required to transfer one or more amounts of the first item from the blockchain address to another blockchain address or location. In one scenario, a threshold number of partial signatures (e.g., respectively derived from the key shares and a corresponding transaction) may be required to generate a complete valid signature for a signed transaction that transfers such amounts of the first item from the blockchain address to another blockchain address or location.

In some embodiments, step 406 may include obtaining confirmation of a receipt of a second amount of a second item (e.g., different from the first item) from the first user and causing the transfer of the first item to the blockchain address based on the confirmation. As an example, based on the confirmation of the receipt of the second amount of the second item, another signed message may be generated using a second private key (e.g., from which a source blockchain address is derived, where the source blockchain address is a source of the first amount of the first item), and this signed message may be transmitted to the blockchain to cause the transfer of the first item to the blockchain address. In one use case, the signed message (generated with the second private key) may indicate a transfer of the first amount of the first item from the source blockchain address to the blockchain address. As an example, this signed message may include an indication of the transfer of the first amount of the first item (from the source blockchain address to the blockchain address) and a digital signature derived from the second private key and the message portion of the signed message.

At step 408, process 400 (e.g., using one or more components described above) obtains a candidate cryptographic representation and a partially-signed message from the second user. As an example, the candidate cryptographic representation and the partially-signed message may be obtained from the second user in connection with the request to transfer the first item from the first user to the second user. As another example, the candidate cryptographic representation may be a representation of the physical item (e.g., a candidate hash representing the physical item), and the partially-signed message may include a partial signature derived from the second key share of the second user and an indication of the transfer of the first amount of the first item from the blockchain address (e.g., to a second blockchain address associated with the second user, another blockchain address designated by the second user, etc.). In one use case, upon the second user receiving the physical item (e.g., from the first user), the second computer system of the second user may obtain an image of the physical item, generate a feature vector of the image (e.g., by extracting features from the image via one or more machine learning models), and provide the feature vector as an input to a hash function to obtain the candidate hash (e.g., as an output of the hash function that is subsequently sent by the second computer system as the candidate cryptographic representation of the physical item). In another use case, the first computer system of the first user may send the image of the physical item to the second computer system of the second user, and the second computer system may generate and provide the candidate cryptographic representation of the physical item based on the image (e.g., without the second user having to receive the physical item from the first user).

At step 410, in response to the candidate cryptographic representation matching the physical item's cryptographic representation (e.g., the pre-stored cryptographic representation), process 400 (e.g., using one or more components described above) generates a signed message using the partial signatures (derived from two or more of the key shares). As an example, the signed message may include an indication of the transfer of the first amount of the first item from the blockchain address (e.g., to the second blockchain address associated with the second user, another blockchain address designated by the second user, etc.) and a signature derived from the partial signatures (e.g., by combining the partial signatures derived from the second and third key shares to generate the signature, by inputting the partial signatures as parameters into a signature generation function to obtain the signature, etc.).

In some embodiments, step 410 may include generating the signed message using the partial signatures derived from the first, second, and third key shares, respectively (e.g., a first partial signature derived from the first key share of the first user, a second partial signature derived from the second key share of the second user, and a third partial signature derived from the third key share of the intermediary entity). In some embodiments, one or more partially-signed messages may be obtained (e.g., by the intermediary entity) from the second user, and the partial signatures of the partially-signed messages may include the partial signatures derived from the first and second key shares. As an example, the partial signatures may include the first partial signature derived from the first key share of the first user (e.g., by using the first key share to sign a message portion that includes the transfer indication) and the second partial signature derived from the second key share of the second user (e.g., by using the second key share to sign a message portion that includes the transfer indication). In this way, for example, where the intermediary entity generates the signed message (e.g., with a complete signature to facilitate the transfer of the first amount of the first item from the blockchain address), the intermediary entity is able to facilitate the transfer without necessarily requiring the first user to be online to participate in the threshold signing process (e.g., even if the first key share is necessary for completing the thresholding signing process) because the second user has provided the partial signature derived from the first key share. As an example, the second user may obtain the first key share from the first user prior to the threshold signing process, and, thus, the second user may initiate the transfer of resources from the blockchain address (e.g., with the participation of the intermediary entity and the third key share) without necessarily requiring an explicit authorization from the first user for the specific transfer initiated by the second user.

In some embodiments, a partially-signed message obtained from the second user may include (i) an indication of the transfer of the first amount of the first item from the blockchain address (e.g., to another blockchain address designated by the second user), (ii) the first partial signature derived from the first key share of the first user, and (iii) the second partial signature derived from the second key share of the second user. As an example, the first and second partial signatures may be derived by signing the same message portion of the partially-signed message with the first and second key shares, respectively. In this way, for example, duplicate generation and transmission of the same message portion may be avoided, thereby reducing network bandwidth and other computer resource usage.

In some embodiments, step 410 may include generating the signed message based on (i) the candidate cryptographic representation matching the cryptographic representation of the physical item and (ii) verification of one or more messages of the partially-signed messages as being signed with the first and second key shares (e.g., verification that a message was signed with the first or second key share, verification that both message was respectively signed with one of the first or second key shares, etc.). As an example, one or more public key shares (corresponding to the signing/private key shares, e.g., the first and second key shares) may be used to verify that the partial signatures are respectively derived from the first and second key shares.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method comprising: causing generation of key shares of a key (e.g., a private key) from which a blockchain address on a blockchain is derived (e.g., where such generation is in connection with a request for a transfer of a first item of a first user to a second user), the key shares comprising a first key share for the first user, a second key share for the second user, and a third key share for an intermediary entity; causing a first amount of the first item to be transferred to the blockchain address; obtaining, from the second user (e.g., in connection with the requested transfer of the first item), one or more partially-signed messages that indicate transfer of the first amount of the first item from the blockchain address, the one or more partially-signed messages comprising a partial signature derived from the second key share; and generating a signed message using the partial signature and another partial signature derived from the third key share, the signed message indicating transfer of the first amount of the first item from the blockchain address.

2. The method of any one of the preceding embodiments, wherein causing the generation of the key shares of the key from which the blockchain address is derived comprises: transmitting first instructions for generating the first key share to a first computer system of the first user and second instructions for generating the second key share to a second computer system of the second user, wherein the first key share is generated by the first computer system of the first user, and the second key share is generated by the second computer system of the second user.

3. The method of any one of the preceding embodiments, wherein causing the generation of the key shares of the key from which the blockchain address is derived comprises: generating, by a computer system of the intermediary entity, the third key share; and transmitting first instructions for generating the first key share to a first computer system of the first user and second instructions for generating the second key share to a second computer system of the second user, wherein the first key share is generated by the first computer system of the first user, and the second key share is generated by the second computer system of the second user.

4. The method of any one of the preceding embodiments, wherein causing the first amount of the first item to be transferred to the blockchain address comprises: in connection with the request for the transfer of the first item of the first user, obtaining confirmation of a receipt of a second amount of a second item from the first user, the second item being different from the first item; generating, based on the confirmation of the receipt of the second amount of the second item, another signed message using a second key from which a source blockchain address is derived, the source blockchain address being a source of the first amount of the first item, the signed message indicating a transfer of the first amount of the first item from the source blockchain address to the blockchain address; and transmitting the other signed message to the blockchain.

5. The method of any one of the preceding embodiments, further comprising: generating a cryptographic representation of a physical item (e.g., corresponding to the first item) to be transferred from the first user to the second user (e.g., in connection with the requested transfer of the first item); and obtaining, from the second user (e.g., in connection with the requested transfer of the first item), a candidate cryptographic representation (e.g., of the physical item), wherein generating the signed message comprises generating the signed message based on the candidate cryptographic representation matching the cryptographic representation of the physical item.

6. The method of the preceding embodiment, wherein the cryptographic representation comprises a hash representing the physical item to be transferred from the first user to the second user in connection with the requested transfer of the first item, wherein generating the signed message comprises generating, based on the candidate cryptographic representation matching the hash representing the physical item, the signed message using the partial signature derived from the second key share and the partial signature derived from the third key share.

7. The method of embodiment 5 and any one of the preceding embodiments depending therefrom, further comprising: obtaining an image to be printed as the physical item; extracting features of the image to generate a feature vector of the image to be printed as the physical item; and wherein generating the cryptographic representation comprises providing the feature vector as input to a hash function to obtain a hash of the feature vector of the image, and wherein generating the signed message comprises generating, based on the candidate cryptographic representation matching the hash of the feature vector of the image, the signed message using the partial signature derived from the second key share and the partial signature derived from the third key share.

8. The method of any one of the preceding embodiments, further comprising: generating the other partial signature using the third key share and a message indicating the transfer of the first amount of the first item from the blockchain address, wherein the partial signature is derived from the second key share and the message used to generate the other partial signature.

9. The method of any one of the preceding embodiments, wherein generating the signed message comprises generating the signed message using the partial signature derived from the second key share, the other partial signature derived from the third key share, and at least one partial signature derived from the first key share.

10. The method of any one of the preceding embodiments, wherein generating the signed message comprises generating the signed message, using the partial signature derived from the second key share and the other partial signature derived from the third key share, based on verification of at least one message of the one or more partially-signed messages as being signed with the second key share.

11. The method of any one of the preceding embodiments, wherein the one or more partially-signed messages comprises a first partially-signed message comprising at least one partial signature derived from the first key share and a second partially-signed message comprising the partial signature derived from the second key share, wherein generating the signed message comprises generating the signed message, using the partial signature derived from the second key share and the other partial signature derived from the third key share, based on verification of the first partially-signed message as being signed with the first key share, and (iii) verification of the second partial signature as being signed with the second key share.

12. A tangible, non-transitory, machine-readable medium storing instructions that, when executed by a data processing apparatus, cause the data processing apparatus to perform operations comprising those of any of embodiments 1-11.

13. A system comprising one or more processors; and memory storing instructions that, when executed by the processors, cause the processors to effectuate operations comprising those of any of embodiments 1-11.

14. A system comprising means for performing any of embodiments 1-11.

What is claimed is:

1. A system for enabling physical-action-based verification for completing a threshold signature scheme involving distributed multiparty computation (MPC) generated key shares, the system comprising:
   one or more processors; and
   one or more non-transitory computer-readable media storing instructions that, when executed by the one or more processors, cause the one or more processors to perform operations comprising:

in response to a request for a transfer of a first item of a first user to a second user:
(i) causing, via an MPC process, distributed key generation of multiple key shares of a private key from which a blockchain address on a blockchain is derived, the multiple key shares comprising a first key share generated by a first computer system of the first user, a second key share generated by a second computer system of the second user, and a third key share generated by an intermediary computer system;
(ii) generating a hash of a feature vector representing a physical item to be transferred from the first user to the second user in connection with the requested transfer of the first item, the physical item corresponding to the first item;
causing a first amount of the first item to be transferred to the blockchain address;
obtaining, from the second user in connection with the requested transfer of the first item, a candidate hash and a partially-signed message that indicates transfer of the first amount of the first item from the blockchain address to another blockchain address, the partially-signed message comprising a partial signature derived from the second key share; and
in response to the candidate hash matching the hash of the feature vector representing the physical item, (i) generating a signed message using the partial signature and another partial signature derived from the third key share and (ii) transmitting the signed message to the blockchain, the signed message indicating the transfer of the first amount of the first item from the blockchain address to the other blockchain address.

2. A method comprising:
in connection with a request for a transfer of a first item of a first user to a second user, causing generation of key shares of a private key from which a blockchain address on a blockchain is derived, the key shares comprising a first key share for the first user, a second key share for the second user, and a third key share for an intermediary entity;
generating a cryptographic representation of a physical item, the physical item corresponding to the first item;
causing a first amount of the first item to be transferred to the blockchain address;
obtaining, from the second user in connection with the requested transfer of the first item, a candidate cryptographic representation and one or more partially-signed messages that indicate transfer of the first amount of the first item from the blockchain address, the one or more partially-signed messages comprising a partial signature derived from the second key share; and
generating, based on the candidate cryptographic representation matching the cryptographic representation of the physical item, a signed message using the partial signature and another partial signature derived from the third key share, the signed message indicating the transfer of the first amount of the first item from the blockchain address, wherein the cryptographic representation comprises a hash representing the physical item to be transferred from the first user to the second user in connection with the requested transfer of the first item,
wherein generating the signed message comprises generating, based on the candidate cryptographic representation matching the hash representing the physical item, the signed message using the partial signature derived from the second key share and the partial signature derived from the third key share.

3. The method of claim 2, wherein causing the generation of the key shares of the private key from which the blockchain address is derived comprises:
transmitting first instructions for generating the first key share to a first computer system of the first user and second instructions for generating the second key share to a second computer system of the second user,
wherein the first key share is generated by the first computer system of the first user, and the second key share is generated by the second computer system of the second user.

4. The method of claim 2, wherein causing the generation of the key shares of the private key from which the blockchain address is derived comprises:
generating, by a computer system of the intermediary entity, the third key share; and
transmitting first instructions for generating the first key share to a first computer system of the first user and second instructions for generating the second key share to a second computer system of the second user,
wherein the first key share is generated by the first computer system of the first user, and the second key share is generated by the second computer system of the second user.

5. The method of claim 2, wherein causing the first amount of the first item to be transferred to the blockchain address comprises:
in connection with the requested transfer of the first item of the first user, obtaining confirmation of a receipt of a second amount of a second item from the first user, the second item being different from the first item;
generating, based on the confirmation of the receipt of the second amount of the second item, another signed message using a second private key from which a source blockchain address is derived, the source blockchain address being a source of the first amount of the first item, the other signed message indicating a given transfer of the first amount of the first item from the source blockchain address to the blockchain address; and
transmitting the other signed message to the blockchain.

6. The method of claim 2, further comprising:
obtaining an image to be printed as the physical item; and
extracting features of the image to generate a feature vector of the image to be printed as the physical item,
wherein generating the cryptographic representation comprises providing the feature vector as input to a hash function to obtain a hash of the feature vector of the image, and
wherein generating the signed message comprises generating, based on the candidate cryptographic representation matching the hash of the feature vector of the image, the signed message using the partial signature derived from the second key share and the partial signature derived from the third key share.

7. The method of claim 2, further comprising:
generating the other partial signature using the third key share and a message indicating the transfer of the first amount of the first item from the blockchain address,
wherein the partial signature is derived from the second key share and the message used to generate the other partial signature.

8. The method of claim 2, wherein generating the signed message comprises generating the signed message using the partial signature derived from the second key share, the other partial signature derived from the third key share, and at least one partial signature derived from the first key share.

9. The method of claim 2,
wherein the one or more partially-signed messages comprise a first partially-signed message comprising at least one partial signature derived from the first key share and a second partially-signed message comprising the partial signature derived from the second key share,
wherein generating the signed message comprises generating the signed message, using the partial signature derived from the second key share and the other partial signature derived from the third key share, based on (i) the candidate cryptographic representation matching the cryptographic representation of the physical item, (ii) verification of the first partially-signed message as being signed with the first key share, and (iii) verification of the partial signature as being signed with the second key share.

10. The method of claim 2, wherein generating the signed message comprises generating the signed message, using the partial signature derived from the second key share and the other partial signature derived from the third key share, based on (i) the candidate cryptographic representation matching the cryptographic representation of the physical item and (ii) verification of at least one message of the one or more partially-signed messages as being signed with the second key share.

11. One or more non-transitory computer-readable media storing instructions that, when executed by one or more processors, cause operations comprising:
in connection with a request for a transfer of a first item of a first user to a second user, causing generation of key shares of a private key from which a blockchain address on a blockchain is derived, the key shares comprising a first key share for the first user, a second key share for the second user, and a third key share for an intermediary entity, wherein causing the generation of the key shares of the private key from which the blockchain address is derived comprises:
generating the third key share; and
transmitting first instructions for generating the first key share to a first computer system of the first user and second instructions for generating the second key share to a second computer system of the second user, wherein the first key share is generated by the first computer system of the first user, and the second key share is generated by the second computer system of the second user;
causing a first amount of the first item to be transferred to the blockchain address;
obtaining, from the second user in connection with the requested transfer of the first item, one or more partially-signed messages that indicates transfer of the first amount of the first item from the blockchain address, the one or more partially-signed messages comprising one or more partial signatures derived from the first key share and the second key share; and
generating a signed message using the one or more partial signatures and another partial signature derived from the third key share, the signed message indicating the transfer of the first amount of the first item from the blockchain address.

12. The non-transitory computer-readable media of claim 11, wherein causing the generation of the key shares of the private key from which the blockchain address is derived comprises:
transmitting first instructions for generating the first key share to a first computer system of the first user and second instructions for generating the second key share to a second computer system of the second user, wherein the first key share is generated by the first computer system of the first user, and the second key share is generated by the second computer system of the second user.

13. The non-transitory computer-readable media of claim 11, wherein causing the first amount of the first item to be transferred to the blockchain address comprises:
in connection with the requested transfer of the first item of the first user, obtaining confirmation of a receipt of a second amount of a second item from the first user, the second item being different from the first item;
generating, based on the confirmation of the receipt of the second amount of the second item, another signed message using a second private key from which a source blockchain address is derived, the source blockchain address being a source of the first amount of the first item, the other signed message indicating a given transfer of the first amount of the first item from the source blockchain address to the blockchain address; and
transmitting the other signed message to the blockchain.

14. The non-transitory computer-readable media of claim 11, the operations further comprising:
generating a cryptographic representation of a physical item to be transferred from the first user to the second user in connection with the requested transfer of the first item, the physical item corresponding to the first item, wherein the cryptographic representation comprises a hash representing the physical item to be transferred from the first user to the second user in connection with the requested transfer of the first item; and
obtaining a candidate cryptographic representation from the second user in connection with the requested transfer of the first item,
wherein generating the signed message comprises generating, based on the candidate cryptographic representation matching the hash representing the physical item, the signed message using the partial signature derived from the second key share and the partial signature derived from the third key share.

15. The non-transitory computer-readable media of claim 14, the operations further comprising:
obtaining an image to be printed as the physical item; and
extracting features of the image to generate a feature vector of the image to be printed as the physical item,
wherein generating the cryptographic representation comprises providing the feature vector as input to a hash function to obtain a hash of the feature vector of the image, and
wherein generating the signed message comprises generating, based on the candidate cryptographic representation matching the hash of the feature vector of the image, the signed message using the partial signature derived from the second key share and the partial signature derived from the third key share.

16. The non-transitory computer-readable media of claim 14, wherein generating the signed message comprises generating the signed message, using the partial signature derived from the second key share and the other partial signature derived from the third key share, based on (i) the candidate cryptographic representation matching the cryptographic representation of the physical item and (ii) verification of at least one message of the one or more partially-signed messages as being signed with the second key share.

17. The non-transitory computer-readable media of claim 11, the operations further comprising:
generating the other partial signature using the third key share and a message indicating the transfer of the first amount of the first item from the blockchain address,
wherein the partial signature is derived from the second key share and the message used to generate the other partial signature.

18. The non-transitory computer-readable media of claim 11, wherein generating the signed message comprises generating the signed message using the partial signature derived from the second key share, the other partial signature derived from the third key share, and at least one partial signature derived from the first key share.

19. The system of claim 1, wherein the intermediary computer system comprises the one or more processors.

20. The method of claim 2, wherein the method is performed by one or more processors of a computer system of the intermediary entity.

* * * * *